United States Patent
Asad et al.

(10) Patent No.: US 8,726,081 B2
(45) Date of Patent: May 13, 2014

(54) EVENT BASED MODEL FOR MANAGING APPLICATION HEALTH AND FAILURE RECOVERY FOR ASYNCHRONOUS PROCESSING SYSTEMS

(75) Inventors: Khalid A. Asad, Frederick, MD (US); David S. Cruley, Oak Hill, VA (US); John DiClemente, Montgomery Village, MD (US); Paul Ilechko, Skillman, NJ (US); David J. Mulley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 13/159,744

(22) Filed: Jun. 14, 2011

(65) Prior Publication Data

US 2012/0324282 A1 Dec. 20, 2012

(51) Int. Cl.
  *G06F 11/00* (2006.01)
(52) U.S. Cl.
  USPC ................... 714/17; 714/51; 714/55
(58) Field of Classification Search
  USPC ........................ 714/14, 51, 55, 557
  See application file for complete search history.

(56) References Cited

U.S. PATENT DOCUMENTS

| | | | |
|---|---|---|---|
| 6,314,446 B1 * | 11/2001 | Stiles | 718/100 |
| 6,594,787 B1 * | 7/2003 | Chesson | 714/56 |
| 7,457,728 B2 | 11/2008 | Chen et al. | |
| 7,680,848 B2 | 3/2010 | Janedittakarn et al. | |
| 8,370,493 B2 * | 2/2013 | Sirota et al. | 709/226 |
| 2005/0097538 A1 | 5/2005 | Laura | |
| 2005/0154827 A1 * | 7/2005 | Patterson et al. | 711/114 |
| 2006/0229923 A1 | 10/2006 | Adi et al. | |
| 2006/0248207 A1 | 11/2006 | Olson et al. | |
| 2008/0243867 A1 | 10/2008 | Janedittakarn et al. | |
| 2009/0222826 A1 * | 9/2009 | Johnson et al. | 718/102 |
| 2010/0070981 A1 | 3/2010 | Hadar et al. | |
| 2010/0131556 A1 | 5/2010 | Meijer et al. | |
| 2012/0060063 A1 * | 3/2012 | Sakurai | 714/49 |

OTHER PUBLICATIONS

Luckham et al., Complex Event Processing in Distributed Systems, Aug. 18, 1998, 28 pages.
David Luckham, The Power of Events: An Introduction to Complex Event Processing in Distributed Enterprise Systems, Copyright Springer-Verlag Berlin Heidelberg 2008, 1 page.

* cited by examiner

*Primary Examiner* — Charles Ehne
(74) *Attorney, Agent, or Firm* — Douglas A. Lashmit; Hoffman Warnick LLC

(57) ABSTRACT

A method for event management in asynchronous work processing including timing at least one step in an asynchronous work process, wherein the at least one step is performed by an application and the at least one step has an expected time of completion; determining an error preventing step completion in response to the expected time of completion expiring; correcting the error; and re-performing the at least one step.

20 Claims, 5 Drawing Sheets

EVENT BASED MODEL FOR MANAGING APPLICATION HEALTH AND FAILURE RECOVERY FOR ASYNCHRONOUS PROCESSING SYSTEMS

FIELD OF THE INVENTION

The present invention relates generally to event management, and more particularly to managing application health and failure recovery for asynchronous processing systems.

BACKGROUND OF THE INVENTION

A work process may include two or more steps performed by computer based applications. In a synchronous work process, some controlling application component invokes, in turn, each relevant application or component that is responsible for performing each step in the work process. If any component or application fails to complete any given step, the controller is immediately aware that the error occurred, and the point in which the process failed is known.

In an asynchronous work process, the components or applications that perform the steps in the process are decoupled from each other. In contrast to the synchronous work process, during the asynchronous work process, each application or component that performs a step in the work process has work items delivered to it through some queuing mechanism. The application performs work from its incoming queue but may not anticipate how or when items are placed in the queue. As a result, any given application performing steps in the asynchronous work process will not be alerted to a failure of a previous step to be performed.

During asynchronous work processing, it is possible for items of work to become lost or "stuck" between steps in the system with no obvious notification to a user that errors have occurred. Essentially, each step in the asynchronous work process waits for some completed portion of the work process. Each step may not know where a previous step's work is being delivered from. In the asynchronous work process, there may be difficulties in determining where in the work process a problem was encountered.

During asynchronous work processing, there is the possibility of error or failure at each step of the process. For example, one application may fail to perform its function. There is also the possibility of an external failure. For example, a problem with a network, a storage device, or a processor may impact the ability of the application to perform successfully. In either case, it may be useful to detect the error in order to correct the error and resume the asynchronous work process.

SUMMARY OF THE INVENTION

In a first aspect, the invention provides a method for event management in asynchronous work processing, the method comprising: timing, using a computer device, at least one step in an asynchronous work process, wherein the at least one step is performed by an application and the at least one step has an expected time of completion; determining, using the computer device, an error preventing step completion in response to the expected time of completion expiring without a notice of step completion; correcting, using the computer device, the error; and re-performing, using the computer device, the at least one step.

In a second aspect, the invention provides an event management system, comprising: a computer hardware device including: a timing system for timing at least one step in an asynchronous work process, wherein the at least one step is performed by an application and the at least one step has an expected time of completion; an error handling system for determining an error preventing step completion in response to the expected time of completion expiring without a notice of step completion; an error correction system for correcting the error; and a step recovery system for causing the step to be re-performed.

In a third aspect, the invention provides a computer program comprising program code embodied in at least one computer-readable medium, which when executed, enables a computer system to implement a method of event management, comprising: program code for timing at least one step in an asynchronous work process, wherein the at least one step is performed by an application and the at least one step has an expected time of completion; program code for determining an error preventing step completion in response to the expected time of completion expiring without a notice of step completion; program code for correcting the error; and program code for re-performing the at least one step.

BRIEF DESCRIPTION OF THE DRAWINGS

The above and other objects, features and advantages of the invention will be better understood by reading the following more particular description of the invention in conjunction with the accompanying drawings.

Figure 1:
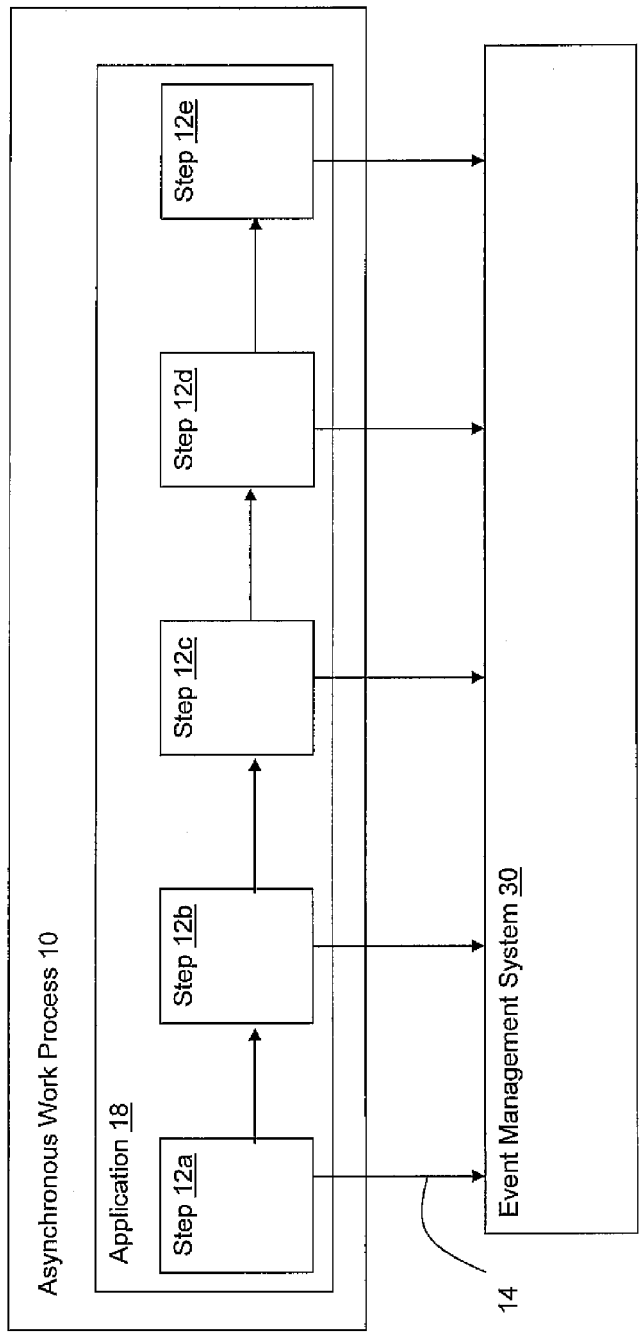
FIG. 1 depicts one embodiment of an event management system in accordance with this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 2:
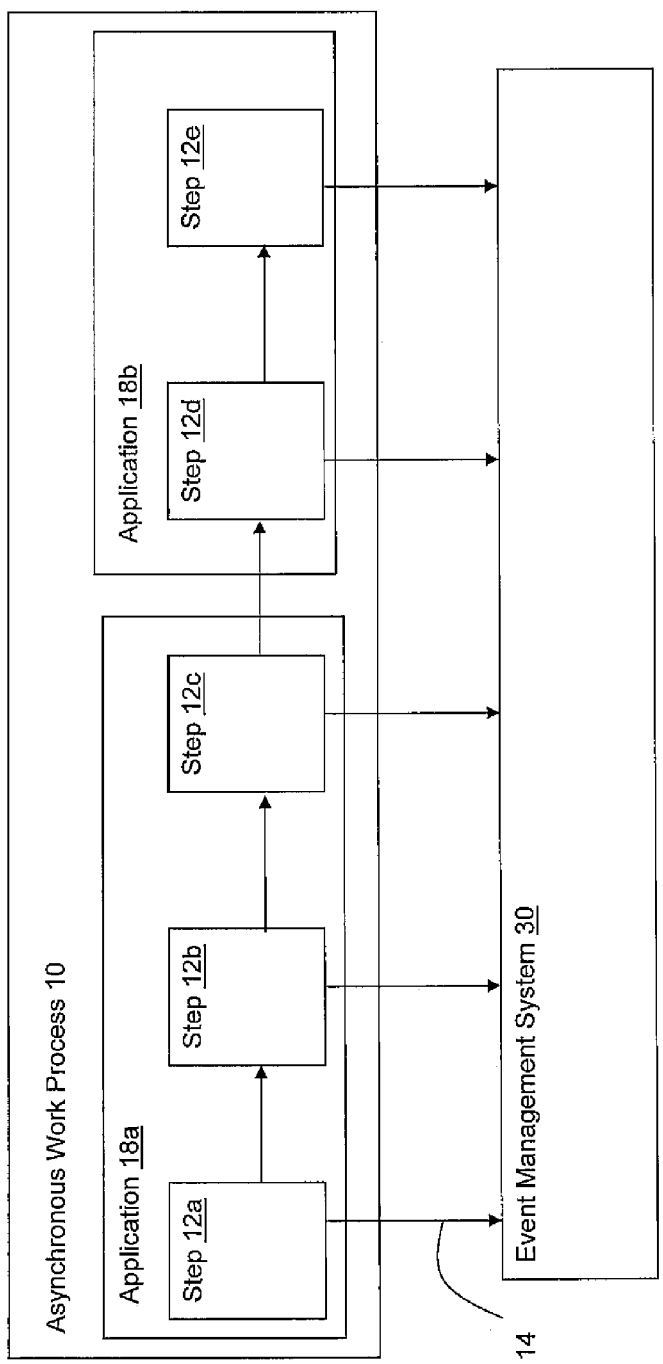
FIG. 2 depicts one embodiment of an event management system in accordance with this invention.
Figure 3:
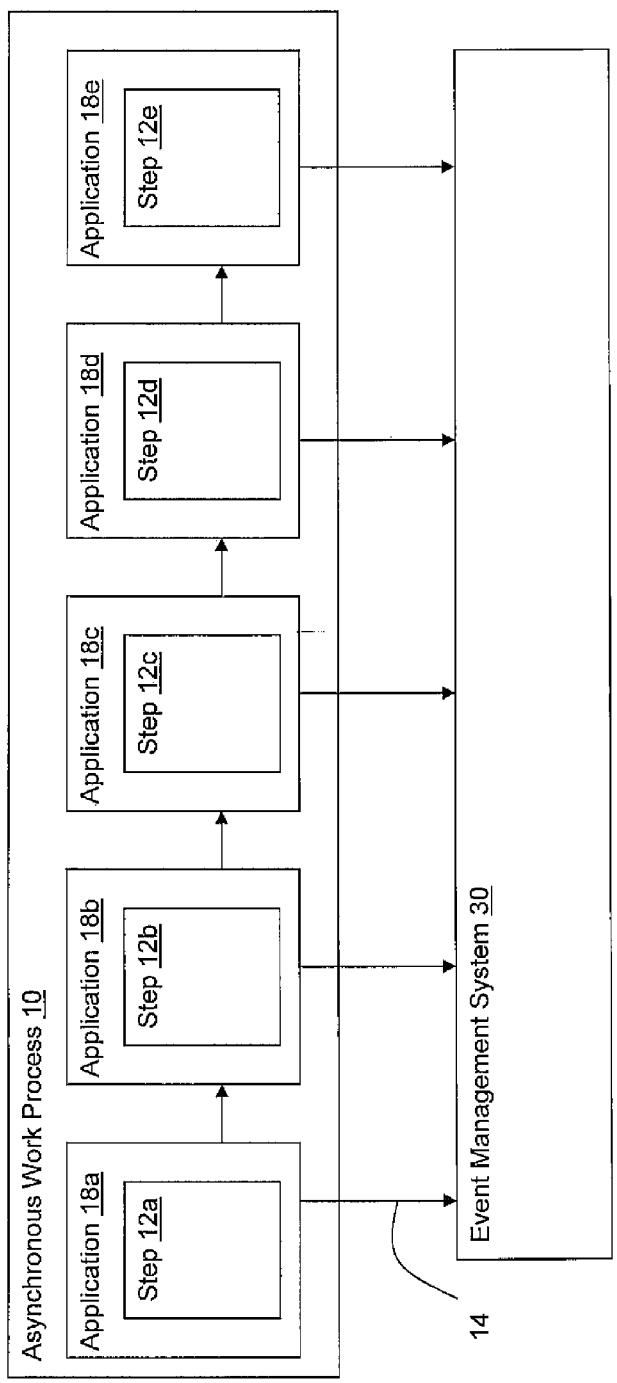
FIG. 3 depicts one embodiment of an event management system in accordance with this invention.

Referring to FIGS. 1, 2, and 3, embodiments of the event management system 30 in accordance with this invention are shown. Event management system 30 is illustrated in relation to an asynchronous work process 10. Event management system 30 utilizes an event-based model and Complex Event Processing (CEP) for lifecycle management of the asynchronous work process 10 and for error detection within the asynchronous work process 10. Asynchronous work process 10 is illustrated with five steps 12a-e in a linear sequence but any number of a plurality of steps 12a-e and any sequence of steps would apply to this invention. Each step 12a-e may perform a different portion of the asynchronous work process 10. As illustrated in FIG. 1, each step 12a-e is performed by an application 18. It should be understood that the steps 12a-e of the asynchronous work process may be performed by one or more applications 18. For example, in FIG. 2, steps 12a-c are performed by application 18a and steps d-e are performed by application 18b. Similarly, for example, in FIG. 3, steps 12a-e are each performed by a different application 18a-e. It should be understood further that one or more steps 12a-e might be performed manually by a human. Referring to FIG. 1, at least one step 12*a-e* is performed by at least one application 18. Event management system 30 may receive information, for example, step completion notices and/or application error notices 14, from the application 18 in the asynchronous work process 10. Application may send application error notice 14 when at least one step 12*a-e* fails to complete. Event management system 30 is provided configured data by a user 26 for an expected time of completion for each step 12*a-e*. Application 18 may provide information to the event management system 30 independent of any other application. Through an encoding of relationships between steps 12*a-e*, event management system 30 knows the asynchronous work process 10. In this way, event management system 30 may be decoupled from the execution of the asynchronous work process 10. Events may include, for example, steps 12*a-e*, step completion notices, and/or application error notices 14 and time completion error notices.

Figure 4:
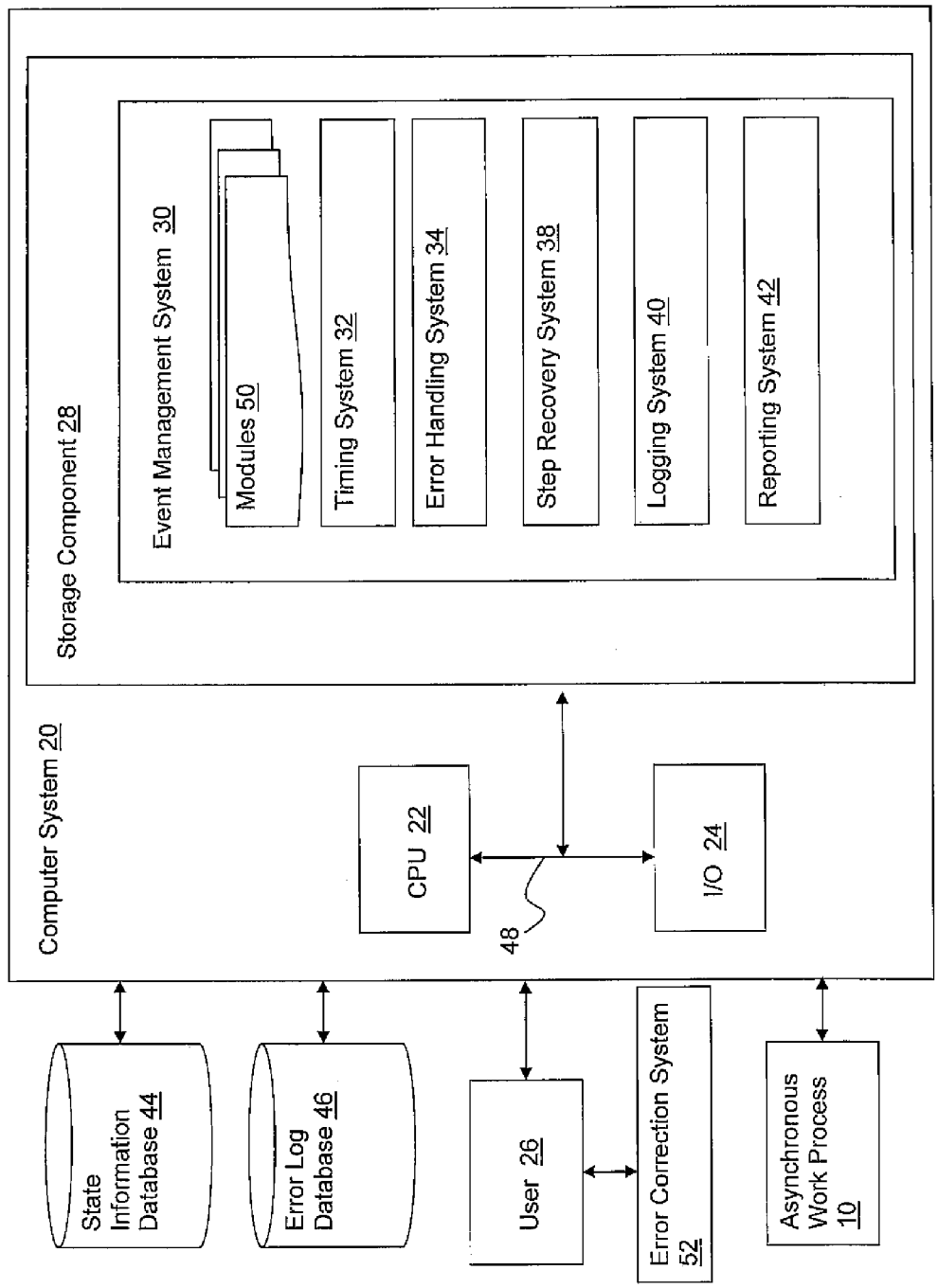
FIG. 4 depicts one embodiment of an event management system in accordance with this invention.

FIG. 4 shows an illustrative embodiment of the invention in which a computer system 20 includes an event management system 30. Event management system 30 is provided to allow user 26 (or some other automated process) to manage steps through the detection and correction of errors and recover steps 12*a-e* in the asynchronous work process 10 to be re-performed. Event management system 30 may be implemented as a software program product that can be stored in storage component 28 and be executed on any type of computer system 20. A person skilled in the art will recognize that the invention may be implemented on one or more computer systems and this disclosure is not intended to limit such potential embodiments. In this illustrative embodiment, event management system 30 includes: a timing system 32; an error handling system 34; a step recovery system 38; a logging system 40; and a reporting system 42.

Timing system 32 may time each step in the asynchronous work process. In one embodiment of the invention, timing system 32 selects any step 12*a-e* in an asynchronous work process 10. Timing system 32 determines whether the expected time of completion for any given step 12*a-e* has expired. If the expected time of completion expires, the timing system 32 may send the time completion error notice to error handling system 34. Time completion error notice notifies error handling system 34 of an error with the step 12*a-e* being timed. If the timing system 32 receives notice of step completion, the timing system 32 begins timing the next step 12*a-e* in the asynchronous work process 10.

Error handling system 34 may receive the application error notice 14 or time completion error notice. The application error notice 14 may be sent by application 18 if an error occurs that is detected by the application 18 during the processing of any given step 18*a-e*. When the error handling system 34 receives the application error notice 14 or time completion error notice, the error associated with that notice is forwarded to an error correction system 52. Error correction system 52 may be configured on the same or a different computer device as event management system 30. Error correction system 52 facilitates user 26 in correcting the error in the asynchronous work process 10. When the error handling system 34 receives application error notice 14 or time completion error notice, error handling system 34 determines what type of error has occurred. Error handling system 34 may determine that the error occurred with the application 18 performing the step 12*a-e*. Alternatively, error handling system 34 may determine that the error occurred external to the application 18 performing the step 12*a-e*, for example, a network error, a communication error, or other related error. The error handling system 34 may forward the error to error correction system 52.

Error correction system 52 may correct the error in response to being notified of the error. Error correction may include system-to-system communication and system-to-user communication. For example, some errors may be corrected by the error correction system 52 directly communicating with application. In other cases, user 26 that is human may need to work with the hardware or software to correct the error. In any event, once the error is corrected, error correction system 52 notifies the step recovery system 38.

In one embodiment, step recovery system 38 may recover the uncompleted step 12*a-e* in the asynchronous work process 10. Recovery of the step may include re-performing the uncompleted step 12*a-e* that failed to perform in the asynchronous work process 10. In one embodiment, step recovery system 38 re-performs the uncompleted step 12*a-e* from the beginning regardless of where the error occurred previously in performing the uncompleted step 12*a-e*. For example, if step 12*c* fails to perform at the mid-point in the process of completing step 12*c*, step recovery system 38 re-performs step 12*c* from the beginning. Alternatively, in one embodiment, error handling system 34 may store state information in a state information database 44. Alternatively, in another embodiment, state information may be in the application error notice 14 or time completion error notice. Alternatively, in another embodiment, a portion of state information may be in the state information database 44 and the remaining state information may be the error notice 14 or time completion error notice. State information may include information related to the point in the step 12*a-e* where the error occurred. State information may also include information concerning a correct input queue for the application 18*a-e* performing the step 12*a-e* where the error occurred. Step recovery system 38 may retrieve state information from the state information database 44. In this way, step recovery system 38 may recover the step 12*a-e* at the point where the error occurred in contrast to starting at the beginning of the step 12*a-e*. For example, using the previous example, step recovery system 38 would re-perform step 12*c* beginning at the mid-point where step 12*c* stopped processing. In any event, once the step 12*c* is recovered, step recovery system 38 may then continue running the subsequent steps 12*d-e*.

One embodiment of this invention may include a logging system 40 for logging errors that occur. When error handling system 34 determines the error, the error may be logged and stored in an error log database 46. In turn, a reporting system 42 may retrieve information from the error log database 46 for purposes of reporting to user 26 a variety of information concerning one or many errors occurring during the asynchronous work process 10. Reporting to user 26 may include information about applications, steps, asynchronous work process 10, the environment in which the asynchronous work process 10 takes place, and any other related features of the asynchronous work process 10. A person skilled in the art will readily recognize a multitude of reporting functionalities.

Figure 5:
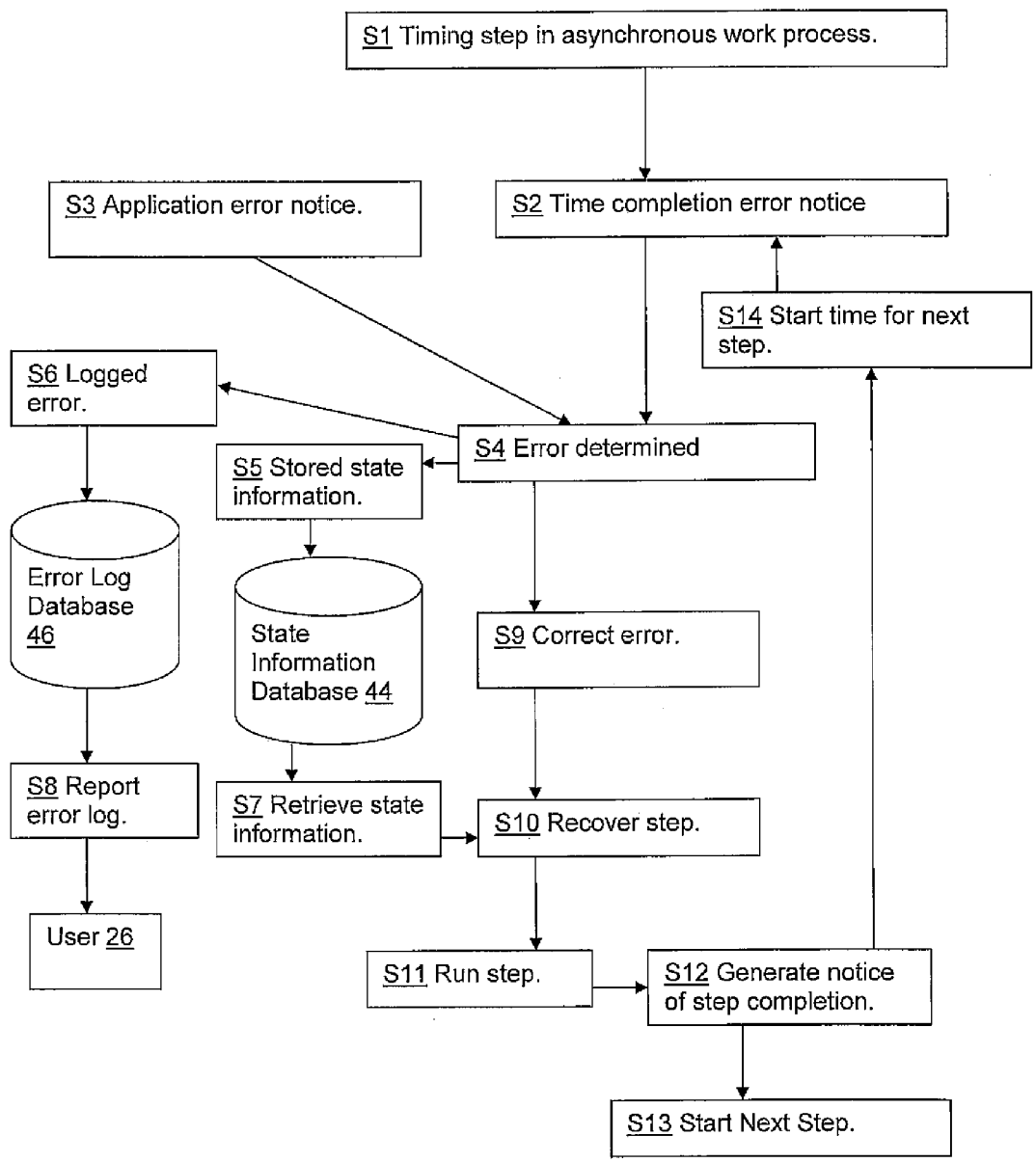
FIG. 5 is a flow chart of one embodiment of the main steps for event management in accordance with this invention.

Referring now to FIG. 5, one embodiment of the process of event management 30 (FIGS. 1-4) as defined by the present invention is described. The process may start at 51 with timing at least one step 12*a-e* (FIGS. 1-3) in the asynchronous work process 10 (FIGS. 1-3). At S2 event management system 30 determines if the expected time of completion for at least one step 12*a-e* has expired. If the expected time of completion for at least one step 12*a-e* expires, timing system 32 (FIG. 4) sends a time completion error notice (FIG. 1-3). At S3, simultaneously and independent of timing step S2, application 18 (FIG. 1-3) may send an application error notice 14 (FIG. 1-3). At S4, in response to receipt of application error notice 14 and/or time completion error notice, error handling system 34 (FIG. 4) may determine the error. As a result the error may be corrected at S9 and the step recovered at S10. To assist with step recovery at S10, event management system 30 may store state information at S5 for the asynchronous work process 10 at the step where error is detected. The state information is stored in state information database 44 (FIG. 4). At S10 during step recovery, event management system 30 may retrieve state information at S7. Further at S4, event management system 30 may log the error at S6 in an error log database 46 (FIG. 4). At S8, Event management system 30 may then report errors to user 26 (FIG. 4). In any event at S11, after step recovery at S10, event management system 30 may run the step 12a-e. At S12, once the step 12a-e is complete, a notice of step completion is sent. At S13, if notice of completion is received at S12, event management system 30 proceeds with the next step in the asynchronous work process 10. Further at S14, if notice of completion is received at S12, the timing system 32 is notified and the expected time of completion for the next step 12a-e in the asynchronous work process 10 begins.

A fundamental aspect of the present invention is that CEP is leveraged to keep track of the flow of work through the application 18 and to trigger error events and actions when error conditions arise within the flow. To support flow tracking the application 18 emits events at key points within the asynchronous work process 10. This may enable two key goals, a) to recover problems by category, and b) to detect stuck items in the asynchronous work process 10 based on timeouts. Each such event provides information about the application 18 specific to the step 12a-e occurring at that point, and therefore from an application 18 perspective, events emitted are independent. The event management system 30 has knowledge of the flow of steps 12a-e through the application 18 based upon an encoding of the relationships between the steps 12a-e and the application 18. This approach enables flexibility in flow definition and deployment through authoring tools provided with CEP software platforms. The event management system 30 also provides for flexibility in defining the conditions under which error events and actions are triggered, since these conditions are represented as rules encoded in the CEP software platform. Essentially, the rules can be used to tell the event management system 30 what a healthy system (i.e. an error free system) looks like. Further, flow error handling, which is implemented by the CEP software platform, is decoupled from application flow execution in the event management system 30.

Event management system 30 may be used in many types of industries. For example, event management system 30 may be used in medical settings. In clinical systems, facilities are scheduled, tests are performed (and sometimes re-done) and results are received and analyzed. Event management system 30 can ensure that all appropriate steps have occurred, and that all results have been processed by the receiving system or human agent. By further example, event management system 30 may be used in financial settings. Many financial organizations provide "straight through processing" of trades, whereby the trade is placed, executed and cleared. Event management system 30 can monitor the overall health of the processing and ensure that all fiduciary responsibilities are met, and all accounting entries are completed within appropriate timeframes. A person skilled in the art will recognize many uses for event management system 30

In FIG. 4, computer system 20 is shown in communication with event management system 30 described herein. Further, computer system 20 is shown in communication with the user 26 and error correction system 52. User 26 may, for example, be a programmer or operator. User 26 may also be a device or a computer. User 26 may be a single device or computer or a plurality of devices or computers. Interactions between these components and computer system 20 will be discussed in subsequent portions of this application. Computer system 20 is shown including a processing component (PC) 22 (e.g., one or more processors), a storage component 28 (e.g., a storage hierarchy), an input/output (I/O) component 24 (e.g., one or more I/O interfaces and/or devices), and a communications pathway 48. In one embodiment, processing component 22 executes program code, such as event management system 30, which is at least partially embodied in storage component 28. While executing program code, processing component 22 can process data, which can result in reading and/or writing the data to/from storage component 28 and/or I/O component 24 for further processing. Pathway 48 provides a communications link between each of the components in computer system 20. I/O component 24 can comprise one or more human I/O devices or storage devices, which enable user 26 to interact with computer system 20 and/or one or more communications devices to enable user 26 to communicate with computer system 20 using any type of communications link. To this extent, event management system 30 can manage a set of interfaces (e.g., graphical user interface(s), application program interface, and/or the like) that enable human and/or system interaction with event management system 30.

In any event, computer system 20 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, event management system 30 can be embodied as any combination of system software and/or application software. In any event, the technical effect of computer system 20 is to provide detection of errors during asynchronous work processing.

Further, event management system 30 can be implemented using a set of modules 50. In this case, a module 50 can enable computer system 20 to perform a set of tasks used by event management system 30, and can be separately developed and/or implemented apart from other portions of event management system 30. Event management system 30 may include modules 50 which comprise a specific use machine/hardware and/or software. Regardless, it is understood that two or more modules 50, and/or systems may share some/all of their respective hardware and/or software. Further, it is understood that some of the functionality discussed herein may not be implemented or additional functionality may be included as part of computer system 20.

When computer system 20 comprises multiple computing devices, each computing device may have only a portion of event management system 30 embodied thereon (e.g., one or more modules 50). However, it is understood that computer system 20 and event management system 30 are only representative of various possible equivalent computer systems that may perform a process described herein. To this extent, in other embodiments, the functionality provided by computer system 20 and event management system 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, event management system 30 enables computer system 20 to provide processing instructions for detection of errors during asynchronous work processing. Event management system 30 may include logic, which may include the following functions: timing system 32, error handling system 34, step recovery system 38, logging system 40, and reporting system 42. In one embodiment, event management system 30 may include logic to perform the above-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, event management system 30 and logic included therein will be described herein as a specific use machine. As will be understood from the description, while logic is illustrated as including each of the above-stated functions, not all of the functions are necessary according to the teachings of the invention as recited in the appended claims.

While shown and described herein as event management system 30, it is understood that aspects of the invention further provide various alternative embodiments. For example, in one embodiment, the invention provides a computer program embodied in at least one computer-readable medium, which when executed, enables a computer system to determine and correct errors and recover the step in the asynchronous work process. To this extent, the computer-readable medium includes program code, such as event management system 30, which implements some or all of a process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; paper; and/or the like.

In still another embodiment, the invention provides a method of determining and correcting errors and recovering the step in the asynchronous work process. In this case, a computer system, such as computer system 20 (FIG. 4), can be obtained (e.g., created, maintained, made available, etc.) and one or more modules 50 for performing a process described herein can be obtained (e.g., created, purchased, used, modified, etc.) and deployed to the computer system. To this extent, the deployment can comprise one or more of: (1) installing program code on a computing device from a computer-readable medium; (2) adding one or more computing and/or I/O devices to the computer system; and (3) incorporating and/or modifying the computer system to enable it to perform a process described herein.

It is understood that aspects of the invention can be implemented as part of a business method that performs a process described herein on a subscription, advertising, and/or fee basis. That is, a service provider could offer to provide processing instructions for determining and correcting errors and recovering the step in the asynchronous work process as described herein. In this case, the service provider can manage (e.g., create, maintain, support, etc.) a computer system, such as computer system 20 (FIG. 3), that performs a process described herein for one or more customers. In return, the service provider can receive payment from the customer(s) under a subscription and/or fee agreement, receive payment from the sale of advertising to one or more third parties, and/or the like.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for event management in asynchronous work processing, the method comprising:
    timing, using a computer device, at least one step in an asynchronous work process, wherein the at least one step is performed by an application and the at least one step has an expected time of completion;
    determining, using the computer device, an expiration of the expected time of completion for the at least one step;
    determining, using the computer device, an error that prevents step completion in response to the expiration of the expected time of completion;
    correcting, using the computer device, the error; and
    re-performing, using the computer device, the at least one step.

2. The method of claim 1, wherein the re-performing further comprises:
    recovering, using the computer device, the at least one step, wherein the recovering retrieves the at least one step at a point where the error prevented the at least one step from continuing;
    running, using the computer device, the at least one step;
    receiving, using the computer device, the notice of step completion; and
    starting, using the computer device, the timing for a next step in response to the notice of step completion being received.

3. The method of claim 1, wherein the recovering the at least one step is in response to correcting the error.

4. The method of claim 1, wherein the determining includes storing a state information of the at least one step.

5. The method of claim 4, wherein the recovering includes retrieving the state information for the at least one step.

6. The method of claim 1, wherein the determining includes receiving, from the application, at least one application error notice.

7. The method of claim 1, further comprising logging the determined error in an error log.

8. The method of claim 7, further comprising reporting the error log to a user.

9. An event management system, comprising:
a computer hardware device including:
a timing system for timing at least one step in an asynchronous work process, wherein the at least one step is performed by an application and the at least one step has an expected time of completion and determining an expiration of the expected time of completion for the at least one step;
a error handling system for determining an error that prevents step completion in response to the expiration of the expected time of completion;
an error correction system for correcting the error; and
a step recovery system for causing the step to be re-performed.

10. The system of claim 9, wherein the recovering the at least one step is in response to correcting the error.

11. The system of claim 9, wherein the determining includes storing a state information of the at least one step.

12. The system of claim 11, wherein the recovering includes retrieving the state information for the at least one step.

13. The system of claim 9, further comprising a logging system for logging the detected error in an error log.

14. The system of claim 13, further comprising a reporting system for reporting the error log to a user.

15. The system of claim 9, wherein the detecting includes receiving, from the application, at least one application error notice.

16. The system of claim 9, wherein the step recovery system further comprises:
recovering the at least one step, wherein the recovering retrieves the at least one step at a point where the error prevented the at least one step from continuing;
running the at least one step;
receiving the notice of step completion; and
starting the timing for a next step in response to the notice of step completion being received.

17. A computer program comprising program code embodied in at least one computer-readable medium, which when executed, enables a computer system to implement a method of event management, the method comprising:
program code for timing at least one step in an asynchronous work process, wherein the at least one step is performed by an application and the at least one step has an expected time of completion;
program code for determining, using the computer device, an expiration of the expected time of completion for the at least one step;
program code for determining an error that prevents step completion in response to the expiration of the expected time of completion;
program code for correcting the error; and
program code for re-performing the at least one step.

18. The program product of claim 17, wherein the program code for re-performing further comprises:
recovering the at least one step;
running the at least one step;
receiving the notice of step completion; and
starting the timing for a next step in response to the notice of step completion being received.

19. The program product of claim 17, wherein the program code for detecting includes storing a state information of the at least one step.

20. The program product of claim 19, wherein the program code for recovering includes retrieving the state information for the at least one step.

* * * * *